United States Patent
Janakiraman et al.

(10) Patent No.: US 8,924,572 B2
(45) Date of Patent: *Dec. 30, 2014

(54) TOPOLOGY DETECTION OF LTE NODES

(75) Inventors: Vignesh Janakiraman, Plano, TX (US); Aleksey G. Ivershen, Garland, TX (US)

(73) Assignee: Tektronix, Inc., Beaverton, OR (US)

( * ) Notice: Subject to any disclaimer, the term of this patent is extended or adjusted under 35 U.S.C. 154(b) by 1044 days.

This patent is subject to a terminal disclaimer.

(21) Appl. No.: 12/974,860

(22) Filed: Dec. 21, 2010

(65) Prior Publication Data

US 2012/0155324 A1 Jun. 21, 2012

(51) Int. Cl.
*G06F 15/16* (2006.01)
*H04L 12/26* (2006.01)
*H04W 24/08* (2009.01)
*H04L 12/24* (2006.01)

(52) U.S. Cl.
CPC ............. *H04W 24/08* (2013.01); *H04L 43/028* (2013.01); *H04L 41/12* (2013.01)
USPC ........... 709/228; 709/220; 709/221; 709/223; 370/389; 455/466

(58) Field of Classification Search
CPC ............ H04L 43/028; H04L 29/08576; H04L 29/0809; H04L 29/06537; H04L 29/06; H04W 24/08
USPC ....................................................... 709/228
See application file for complete search history.

(56) References Cited

U.S. PATENT DOCUMENTS

2008/0095167 A1 * 4/2008 Bruss ............................ 370/394
2009/0116404 A1 5/2009 Mahop et al.
2011/0165898 A1 * 7/2011 Drevon et al. ................ 455/466
2012/0023360 A1 * 1/2012 Chang et al. .................. 714/4.11
2012/0120831 A1 * 5/2012 Gonsa et al. .................. 370/252

FOREIGN PATENT DOCUMENTS

| EP | 1 727 322 A1 | 11/2006 |
| EP | 1 976 188 A2 | 1/2008 |
| EP | 2 219 322 A1 | 8/2010 |
| EP | 1 976 188 A3 | 4/2011 |
| WO | WO 2010/052157 A1 | 5/2010 |

OTHER PUBLICATIONS

LTE: ETSI TS 136 300 V8.12.0 (Apr. 2010) Evolved Universal Terrestial Radio Access (E-UTRA) (3GPP TS 36.300 Release 8).*
European Patent Office, "European Search Report," issued in EPO Application No. 11193950.0, Apr. 5, 2010, (4 pages).

* cited by examiner

*Primary Examiner* — Tauqir Hussain
(74) *Attorney, Agent, or Firm* — Edwards Wildman Palmer LLP; Scott D. Wofsy; Christopher J. Capelli

(57) ABSTRACT

A network monitoring system probe is coupled to network interfaces and captures data packets. A monitoring system processor identifies messages specific to S1-MME interfaces and identifies GUMMEI parameters in the S1-MME interface messages. The monitoring system creates MME node entries in a network topology list, each of the MME nodes corresponding to a unique GUMMEI value. The monitoring system links individual S1-MME interfaces, SCTP associations, and MME IP addresses to a particular MME in the network topology list. Using authentication messages carried on the S6a and S1-MME interfaces, the monitoring system links individual S6a interfaces and S6a interface IP address to a particular MME in the network topology list and creates one or more HSS node entries in the network topology list. The monitoring system also creates eNodeB, S-GW, and PDN-GW nodes in the network topology list and links them to IP addresses and X2, S11, and S5/S8 interfaces.

17 Claims, 2 Drawing Sheets

TOPOLOGY DETECTION OF LTE NODES

TECHNICAL FIELD

Embodiments are directed, in general, to identifying network nodes and interfaces in a telecommunications network and, more specifically, to identifying nodes and interfaces in a Long Term Evolution (LTE)/System Architecture Evolution (SAE) network.

BACKGROUND

In telecommunications networks, such as LTE/SAE networks, new nodes and links between nodes are added often as the network grows or is updated. In an LTE/SAE network, MME nodes and eNodeBs may be added to increase the network coverage area and number of subscribers supported, for example. Service providers and network operators typically monitor their network to evaluate operating conditions and to identify and correct network problems. A monitoring system used for this purpose needs to know the up-to-date network topology under test, including the new monitored nodes and links, in order to provide correct and accurate measurements and in addition to correlate the measurements to nodes and links (e.g. correlate the alarms to the network entity affected by such event).

The network topology used by the network monitoring system may be updated manually by entering each new node and all associated new interconnections to other nodes. However, manual configuration of the network topology is not desired because it is labor intensive and error prone. Additionally, such manual topology updates typically are delayed some period of time after actual physical updating of the network. In the time between a network update and a manual topology update, the network monitoring system will not be able to properly analyze network protocols or operation.

SUMMARY

A network monitoring system includes one or more passive monitoring probes coupled to network interfaces. The probes are capable of passively and non-intrusively capturing data packets from the network interfaces. The monitoring system further includes a processor receiving and analyzing the captured data packets from the probes. The monitoring system identifies messages specific to S1-MME interfaces from the data packets that were captured from the network interfaces. Within the S1-MME messages, the monitoring system further identifies GUMMEI parameters. The monitoring system creates a network topology list or table. An MME node entry is created by the monitoring system in the network topology list for each unique GUMMEI value. Individual S1-MME interfaces are identified by the monitoring system from the SCTP associations that correspond to the S1-MME interface messages. Individual S1-MME interfaces are linked to a particular MME in the network topology list. Additionally, IP addresses corresponding to an MME endpoint within the S1-MME interface messages are linked to a particular MME in the network topology list.

The monitoring system further correlates authentication messages carried on the S6a and S1-MME interfaces. The monitoring system identifies S6a interface IP addresses corresponding to an MME endpoint within the S6a interface messages, and links each individual S6a interface IP address to a particular MME in the network topology list. The monitoring system creates a single HSS node entry or multiple HSS node entries in the network topology list. The HSS node entry or entries are associated with S6a interface IP addresses that correspond to an HSS endpoint.

The monitoring system further correlates S11 session or bearer messages to the messages specific to S1-MME interfaces. The monitoring system identifies S11 interface IP addresses corresponding to an MME endpoint within the S11 interface messages and links each individual S11 interface IP address to a particular MME in the network topology list. The monitoring system creates S-GW node entries in the network topology list. The S-GW nodes are associated with a unique S11 interface IP address that corresponds to an S-GW endpoint within the S11 interface messages.

The monitoring system creates eNodeB entries in the network topology list. Each of the eNodeB entries corresponding to a unique SCTP association on the S1-MME interface. The IP addresses for the eNodeB endpoint in S1-MME messages are used to correlate individual eNodeBs to X2 interfaces, which are linked to an eNodeB in the network topology list.

The monitoring system also identifies session or bearer messages carried on an S5/S8 interface. A PDN-GW node entry or a group of PDN-GW entries are created in the network topology list. The PDN-GW node entries are associated with S5/S8 interface IP addresses that correspond to a PDN-GW endpoint on the S5/S8 interface.

BRIEF DESCRIPTION OF THE DRAWINGS

Figure 1:
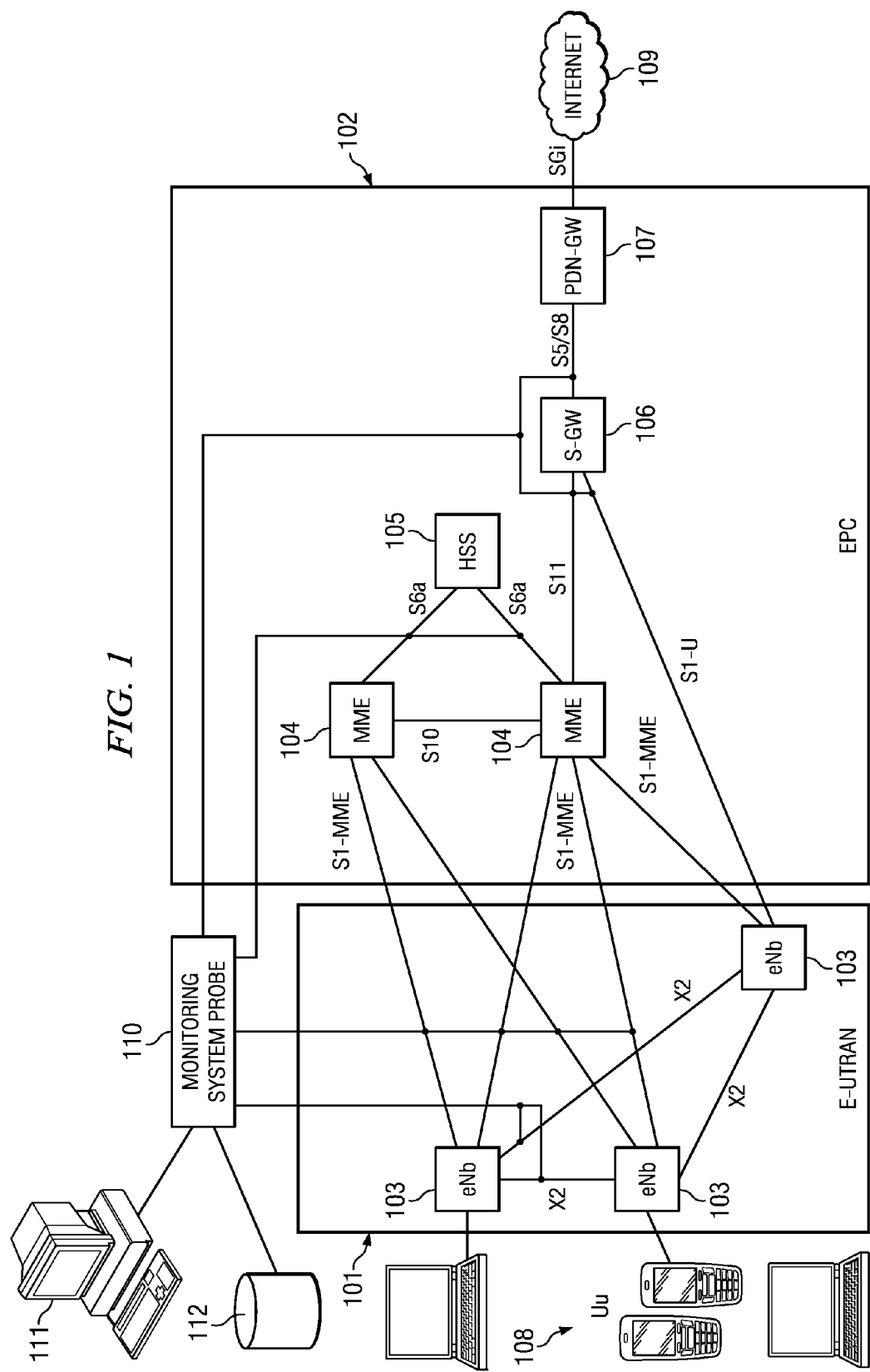

Having thus described the invention in general terms, reference will now be made to the accompanying drawings, wherein:

FIG. 1 is a block diagram illustrating LTE/SAE network architecture; and

Figure 2:
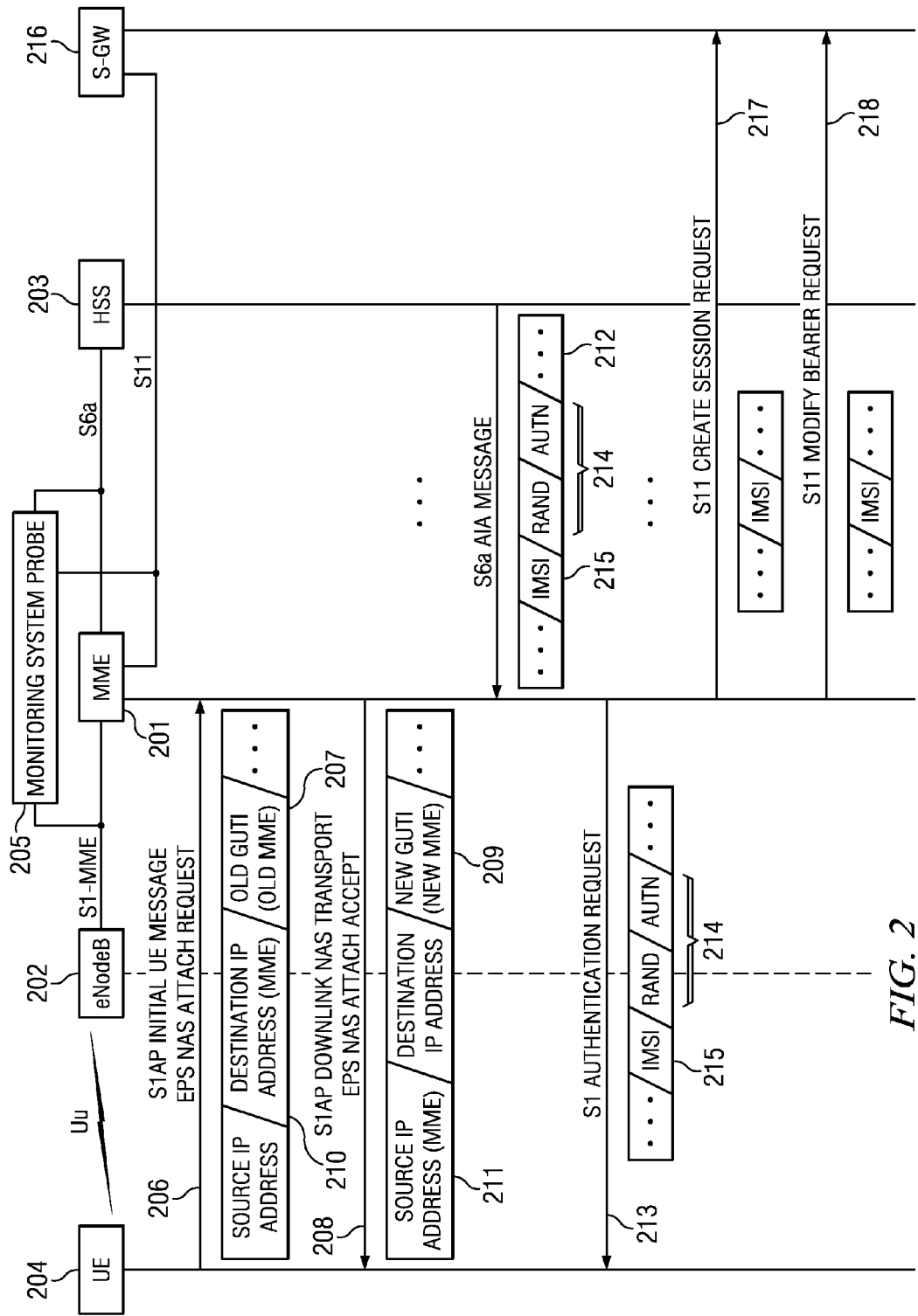

FIG. 2 illustrates messages captured from LTE/SAE network interfaces to determine a network topology.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram illustrating the LTE (Long Term Evolution)/SAE (System Architecture Evolution) network architecture. The LTE/SAE network technology represents mobile network evolution to provide high-rate IP-based services. The standardization entity in charge of specifying the mobile standards, which is known as the $3^{rd}$ Generation Partnership Project (3GPP), has defined standards for mobile telecommunication systems, including both the radio access and the core network evolution. The standard is named Evolved Packet System (EPS), and it specifies the evolution of the UTRAN access network—the evolved UTRAN (eUTRAN) 101—and the concurrent evolution of the Core network—the Evolved Packet Core (EPC) 102. LTE and SAE are commonly used synonyms for eUTRAN 101 and EPC 102, respectively.

The network comprises a number of different types of network nodes and interfaces. The nodes include, for example, an enhanced NodeB (eNodeB or eNb) 103, Mobility Management Entity (MME) 104, Home Subscriber Service (HSS) 105, Serving Gateway (S-GW) 106, and Packet Data Network Gateway (PDN-GW) 107. The interfaces between the nodes in the EPC domain are generally named "S#." The "X2" interface (between eNodeBs) and "Uu" interface (air interface between eNodeBs 103 and User Equipment 108) are in the eUTRAN domain.

The goal of the EPS technology is to significantly enhance the bandwidth available to users and, at the same time, improve the Quality of Service (QoS) of the radio connection. Some of the improvements adopted to achieve this include, for example, Orthogonal Frequency-Division Multiplexing (OFDM) modulation technology, Multiple-Input and Multiple-Output (MIMO) antennas, and a flat, all-IP network architecture. The goal of the selected network components is to improve the mobile user service experience and at the same time reduce CAPEX and OPEX costs for network operators.

The following nodes operate within the eUTRAN domain. User Equipment (UE) 108 is the subscriber endpoint of the end-to-end services. UE 108 communicates over the Uu interface to eNodeBs 103 on the radio path. eNodeB (103) manages the radio path to UE 108 and hosts the physical radio establishment, radio link control, and medium access control functions. eNodeB 103 also encrypts and decrypts data toward the radio resource control (RRC) radio path and handles the radio resource admission and management.

The following nodes operate within the EPC domain. MME 104 is the node responsible for managing the non access stratum (NAS) control plane messages from/to the UE 108. In addition, MME 104 plays a role in selecting S-GW 106 for user plane traffic, coordinates handover in LTE/SAE, and establishes the necessary connections to HSS 105 for authentication and security procedures. MME 104 also coordinates the bearer assignment to the UE 108. HSS 105 has a role similar to the 3G HLR (Home Location Register). HSS 105 maintains subscriber profile and subscription data, subscriber identifiers (e.g. International Mobile Subscriber Identity (IMSI) and Mobile Subscriber Integrated Services Digital Network Number (MSISDN)), and subscriber authentication and security data. HSS 105 is the endpoint for UE 108 location updating procedures coming from MME 104. S-GW 106 is the endpoint of user plane connections from eNodeB nodes 103. S-GW 106 is an anchor for user plane connections in case of UE handover between eNodeBs 103. S-GW 106 also manages charging features and QoS DiffServ handling. PDN-GW (107) is the network node that provides an interface between the EPC with external PDN networks, such as the Internet 109.

In a complex system such as an LTE/SAE network, the tasks of measuring network performance, troubleshooting network operation, and controlling network service behavior can be very difficult for the network operator. Evolution of the network, such as the introduction and deployment of new network technology, causes additional instability and further problems in network measurement, troubleshooting and control. In order to perform these tasks, network operators often make use of external monitoring systems. These monitoring systems are typically connected to the network in a non-intrusive mode that allows them to sniff data from the network interfaces, processing the data and provide measurements and reports that help the network operator to manage its network. The monitoring system typically needs to track the UEs' activities in order to provide detailed analysis of the services used by the subscribers and to collect information about the network's behavior for troubleshooting and optimization purposes.

A monitoring system 110 may be coupled to links in the LTE/SAE network to passively monitor and collect signaling data from one or more interfaces in the network. Monitoring system 110 may collect user plane and control plane data from the EPC and eUTRAN interfaces, including, for example, the S1-MME, S6a, S10, and S11 interfaces that terminate at MME 104, the S1-MME and X2 interfaces that terminate at eNodeB 103, and the S11, S1-U, and S5/S8 interfaces that terminate at S-GW 106. It will be understood that some or all of the other interfaces or links in the network may also be monitored by monitoring system 110. The monitoring system 110 may comprise, in one embodiment, one or more processors running one or more software applications that collect, correlate and analyze Protocol Data Units (PDU) and data packets from eUTRAN 101 and EPC 102.

Monitoring system 110 may incorporate protocol analyzer, session analyzer, and/or traffic analyzer functionality that provides OSI (Open Systems Interconnection) layer 2 to layer 7 troubleshooting by characterizing IP traffic by links, nodes, applications and servers on the network. Such functionality is provided, for example, by the GeoProbe G10 platform, including the Iris Analyzer Toolset applications and Spl-probes, from Tektronix Incorporated. Although a single monitoring system probe is illustrated in FIG. 1, it will be understood that this is for the sake of simplification and that any number of interconnected monitoring system probes may be coupled to one or more interfaces within the LTE/SAE network. A single monitoring probe may capture data from a particular interface, or two or more probes may be coupled to one interface.

Monitoring system 110 may be coupled to network interfaces via packet capture devices, such as high-speed, high-density probes that are optimized to handle high bandwidth IP traffic. Monitoring system 110 passively captures message traffic from the interfaces without interrupting the network's operation. A service provider or network operator may access data from monitoring system 110 via user interface station 111. Monitoring system 110 may further comprise internal or external memory 112 for storing captured data packets, user session data, call records configuration information, and software application instructions. Monitoring system 110 may capture and correlate the packets associated specific data sessions on network interfaces. In one embodiment, related packets can be correlated using a 5-tuple association mechanism. The 5-tuple association process uses an IP correlation key that consists of 5 parts—server IP address, client IP address, source port, destination port, and Layer 4 Protocol (TCP or UDP or SCTP). The related packets can be combined into a record for a particular flow, session or call on the network.

In an alternative embodiment, monitoring system 110 may be an active component, such as a software agent, that resides on an EPC node, such as on MME 104, for example, and that captures data packets passing into or out of the node.

In general, the monitoring system performs the following process to identify and link LTE/SAE network nodes. For MMEs, the monitoring system uses the GUMMEI parameter to uniquely identify individual MMEs. The monitoring system then identifies and groups SCTP associations associated with the MME on the S1-MME interfaces between the MME and eNodeBs and on the S6a interface between the MME and an HSS. The monitoring system also identifies the IP addresses on the MME for the S11 interface between the MME and an S-GW. For eNodeBs, the monitoring system identifies and groups SCTP associations belonging to each eNodeB on the S1-MME interface and on the X2 interface between eNodeBs. For the HSS, the monitoring system identifies and groups SCTP associations belonging to the HSS associated with each MME. For S-GWs, the monitoring system identifies IP addresses on the S-GW for the S11 interface and for the S5/S8 interface. For PDN-GW, the monitoring system identifies IP addresses on the PDN-GW for S5/S8 interface.

The MME detection process is complex because each MME may be connected to many individual interfaces selected from among several different interface types. On each of these interfaces MME may use a different set of IP addresses. The monitoring system must correlate these different interfaces to the appropriate MME. The MME detection process can be split into the following steps:

Create individual MME nodes with unique GUMMEI parameters;
Group each S1-MME interface to a specific MME;
Group S1-MME IP addresses to a specific MME interface;
Group each S6a interface to a specific MME; and
Group each S11 interface to a specific MME.

The GUMMEI (Globally Unique MME Identifier) parameter can be used to identify specific MMEs. The GUMMEI is constructed from the Mobile Country Code (MCC), Mobile Network Code (MNC) and the MME Identifier (MMEI). The MMEI can be further broken down into an MME Group ID (MMEGI) and an MME Code (MMEC). The GUMMEI parameter uniquely identifies each MME within the LTE/SAE network. During network access, a serving MME allocates a Globally Unique Temporary Identity (GUTI) to each UE. Using the GUTI identifier avoids the need to exchange the UE's permanent identity (i.e. its International Mobile Subscriber Identity or IMSI) over the radio access link. The GUTI consists of two components: the GUMMEI and an MME Temporary Mobile Subscriber Identity (M-TMSI). The GUMMEI identifies the MME that has allocated the GUTI. The M-TMSI identifies a specific UE associated with that MME. The GUTI is carried in several EPS Non Access Stratum (NAS) messages, such as the messages carried on top of S1AP. TABLE 1 illustrates the parameters included in the GUTI.

TABLE 1

| GUTI | | | | |
|---|---|---|---|---|
| | GUMMEI | | | M-TMSI |
| MCC | MNC | MMEI | | |
| | | MMEGI | MMEC | |

The monitoring system can analyze the messages that carry the GUTI parameter and can identify a GUMMEI parameter within the GUTI. The GUMMEI can then be assigned to a specific MME. For example, the monitoring system may capture and analyze the S1AP Initial UE and S1AP Downlink NAS Transport messages to identify the GUTI. An S1AP Initial UE message that carries an EPS NAS Attach Request includes the old GUTI for the UE. The old GUTI is the ID that was assigned by the last MME to which the UE was attached. The MME that assigned the old GUTI could be different from the MME to which the UE is currently attached. An analysis of the Attach Request message alone is insufficient to determine if the GUTI belongs to the current MME or the old MME. An S1AP Downlink NAS Transport message that carries an EPS NAS Attach Accept includes the new GUTI (for the current MME) if the old GUTI that was sent in the Attach Request belonged to a different MME. The new GUTI is optional in this message.

The monitoring system may use at least two different solutions to identify the GUTI. On one hand, the monitoring system may analyze only the Attach Accept message, which carries the new GUTI. If the Attach Accept message does not carry a new GUTI, then the message is ignored. Alternatively, the monitoring system may analyze and correlate both the Attach Request and Attach Accept messages. If the Attach Accept message does not carry a new GUTI, then the old GUTI from the Attach Request message is used to identify the MME. Analyzing both messages provides a more robust solution and will provide detection much faster than analyzing only the Attach Accept message.

In addition to using the Attach Request and Attach Accept messages, the Tracking Area Update (TAU) Request and TAU Accept messages can also be analyzed in a similar fashion. The TAU Request message is sent from the eNodeB to an MME and includes a GUTI for the last MME to which the UE was attached. The TAU Accept message is sent from the MME to an eNodeB and may include a GUTI if reallocated.

Using this process over time, the monitoring system should identify the GUMMEIs that are in use in the network. The monitoring system can create a new MME node in a network topology map for each unique GUMMEI. The monitoring system should eventually identify all existing MME nodes in this manner Once MME nodes have been identified, the monitoring system can identify and group each S1-MME interface to one of the existing MMEs. When the GUMMEI parameters are identified, the SCTP association of the Attach Request/Attach Accept message carrying the GUMMEI is associated with the MME along with the GUMMEI value itself. Each SCTP association represents a single S1-MME interface. The GUMMEI Assignment logic is repeated to identify different SCTP associations carrying the same GUMMEI. The monitoring system allocates all identified S1-MME interfaces and SCTP associations to one of the detected MMEs.

When an S1-MME interface is detected as described above, the IP address for one of the end points of the SCTP association is associated to the MME. This is done using the fact that Attach Request is always an uplink message (i.e. from the UE to the MME) and Attach Accept is always a downlink message (i.e. from the MME to the UE). Accordingly, the destination IP address in the Attach Request message and the source IP address in the Attach Accept message are associated with the MME.

In EPS, the MME's can be pooled together and an MME pool can serve the eNodeB's, HSS and SGW nodes. An MME pool can be identified by grouping any MME's that share the same MCC, MNC and MMEGI parameters.

The IP address used by an MME for the S6a interface to an HSS does not share the IP addresses that are used by the MME on the S1-MME interface to the eNodeBs. In order to tie an S6a interface to a specific MME, the S1-MME and S6a interfaces must be correlated. The correlation can be achieved using one of several options.

First, the monitoring system could use the RAND+AUTN parameter in an S1 Authentication Request message (on an S1-MME interface) and match it to the RAND+AUTN parameter in an AIA message (on an S6a interface). One issue that arises with this technique is that the MME can pre-fetch authentication vectors over the S6a interface from the HSS. The MME may not immediately use the authentication vector in an S1 Authentication Request. As a result, there may be a time delay before a RAND+AUTN match is possible. Second, the monitoring system could use the IMSI parameter from an S1 Attach Request, correlate it with S1 Authentication Request and match it with the IMSI in an AIA message on the S6A interface. IMSI is mandatory in S6A AIR/AIA messages, but IMSI is optional in S1AP and in most cases S1AP only uses GUTI. Hence GUTI-IMSI tracking may be necessary to support this option. Once the AIA message is correlated to an MME, the destination IP addresses in the SCTP association that carried the AIA can be added to the list of known MME IP addresses.

Each MME can initiate a procedure on the S6a interface with any of the HSS. With the proposed detection logic, all HSS nodes in the network will be combined into one single HSS node with multiple IP addresses in the monitoring system's topology map. This is acceptable because some service providers configure the HSS as a single box with multiple cards representing different IP addresses.

IP addresses of HSS nodes can be detected using the S6a interface detection mechanism described above for the MMEs. The source IP addresses of the SCTP association carrying the AIA can be used to identify the IP address for the HSS. The monitoring system will create and map a maximum of only one HSS node per MME. One HSS node can serve multiple MMEs.

The monitoring system can also group each of the S11 interfaces to a particular MME. The IP addresses used by an MME for the S11 interface do not share the pool of IP addresses that are used by the MME on the S1-MME interface. In order to tie the S11 interface to a particular MME, the S1-MME and S11 interfaces must be correlated. This correlation can be achieved by extracting the IMSI value from an S1AP Initial UE message and match that value to the IMSI captured from a S11 interface message, such as the Create Session Request or Modify Bearer Request messages. Once the S11 Create Session Request or S11 Modify Bearer Request message is correlated to a particular MME, the source IP address of the S11 message is added to the list of MME IP addresses. The S11 Create Session Response and S11 Modify Bearer Response can be correlated with the messages' respective Requests. The destination IP addresses extracted from the messages in case the Request/Response message goes to a different IP address.

S-GW nodes are detected by combining the S11 interfaces detected using the mechanism described above. S11 interfaces that share the same S-GW IP address are combined into one single S-GW node. One S-GW can serve multiple MMEs, so the monitoring system will create only one SGW node per MME in one embodiment.

eNodeBs can be detected using the S1-MME interface. Each eNodeB has only one SCTP association to a corresponding MME. Once the S1-MME interface is identified, an eNodeB can be created by the monitoring system. IP addresses can be assigned to the eNodeB. When an S1-MME interface is detected, the IP address for one of the end points of the SCTP association is associated to the MME and the other corresponds to the eNodeB. As noted earlier, the Attach Request is always an uplink message (i.e. from the UE to the MME) and Attach Accept is always a downlink message (i.e. from the MME to the UE). Accordingly, the source IP address in the Attach Request message and the destination IP address in the Attach Accept message are associated with the eNodeB.

A global eNodeB identifier can be assigned to the eNodeB by analyzing the SLAP Uplink Direct Transfer message, which has ECGI (E-UTRAN Cell Global Identifier) as a mandatory field. The ECGI is constructed from the MCC, MNC and the ECI (E-UTRAN Cell Identifier). ECGI identifies the eNodeB and the cell it belongs to. The ECGI comprises the PLMN Identity+Cell Identity (28 bits). The leftmost twenty bits of the Cell Identity identifies the eNodeB. Hence a unique eNodeB Identifier (global eNodeB Id) that can be used to distinguish the eNodeB globally within the LTE/SAE network can be created as PLMN Identity+leftmost twenty bits of the Cell Identity. A cell within the eNodeB is identified by the entire ECGI.

eNodeBs can communicate with each other via the X2 interface. Each eNodeB has only one SCTP association over an X2 interface to each other eNodeB to which it is connected. X2 interface detection can be accomplished in two different ways. First, the monitoring system can assume that an eNodeB shares the same IP address for the S1-MME interface and the X2 Interface. So once an S1-MME interface has been tied to an eNodeB, the X2 interface can also tied up to the same eNodeB using the common eNodeB IP address Second option for identifying the X2 interface is to monitor the X2 Setup Request message which includes the global eNodeB Id of the source eNodeB, and to monitor the X2 Setup Response message which contains the global eNodeB ID of the target eNodeB. Since global eNodeB Id's have already been detected and assigned as discussed above, an X2 interface can be detected between two eNodeB's identified by their global eNodeB Id's.

The IP addresses used by the S-GW for the S11 interface to the MMEs do not share the same pool of IP addresses that are used on the S5/S8 interface to the PDN-GW. To tie the S5/S8 interface to a particular S-GW, a correlation between S5/S8 and S11 is needed. This correlation can be achieved by extracting the IMSI captured from the S11 Create Session Request or S11 Modify Bearer Request messages and matching the IMSI with the S5/S8 Create Session Request message. The source IP address of S5/S8 Create Session Request can then be associated with the S-GW.

PDN-GW nodes are detected using messages captured from the S5/S8 interface to the S-GW. The destination IP address of the S5/S8 Create Session Request and S5/S8 Modify Bearer Request messages can be associated to the PDN-GW. One S-GW can connect to multiple PDN-GW's. In order to detect multiple PDN-GWs, each unique PDN-GW IP address is detected as a single PDN-GW node. The APN (Access Point Name) in the S5/S8 Create Session Request is extracted and associated with the PDN-GW node as an attribute. One PDN-GW node can have multiple APNs as attributes. If the same APN appears in two different PDN-GWs, then those PDN-GWs are merged into one node.

The monitoring system can infer that an S-GW is connecting to a new PDN-GW rather than an existing PDN-GW by observing call flows with the S11 Create Session Request message. If an S11 Create Session Request message with non-zero TEID (Tunnel Endpoint Identifier) triggers an S5/S8 Create Session Request message with zero TEID, then the UE has connected to more than one PDN-GW.

FIG. 2 illustrates messages captured from LTE/SAE network interfaces to determine a network topology. MME 201 is coupled to eNodeB 202 via an S1-MME interface and to HSS 203 via an S6a interface. eNodeB 202 communicates with UE 204 over the air interface Uu. Monitoring system probe 205 is coupled to the S1-MME and S6a interfaces and, in one embodiment, passively captures PDUs sent to and from the MME 201. Although only one MME 201 is shown in FIG. 2 for simplification, it will be understood that the monitoring system probe 205 may be coupled to any number of S1-MME, S6a and other interfaces that are associated with any number of MMEs, HSSs and other nodes.

Using data in the captured messages, the monitoring system probe 205 identifies active MMEs. For example, when monitoring system probe 205 captures Attach Request message 206 from UE 204 on the S1-MME interface, the probe will identify the GUTI parameter 207. The GUTI parameter in message 206 is associated with the last MME to which UE 204 was associated, which may have been MME 201 or another MME. Monitoring system probe 205 also captures Attach Accept message 208 from MME 201. The probe will identify the GUTI parameter 209, which is associated with the current MME 201. However, GUTI 209 is optional, so monitoring system 205 may correlate related messages 206 and 208 and compare GUTI 207 and GUTI 209, if present, to determine if they the same or different MMEs. If GUTI 209 is not present, then the monitoring system will use GUTI 207. Using GUTI 209 or GUTI 207, if necessary, the monitoring system will extract the GUMMEI parameter and, if it is a new value, will assign it to a new MME in the network.

The SCTP association for messages 206 and 208 are associated with the new MME that has been identified in GUTI 209 or 207. Additionally, the IP addresses associated with one end of the SCTP association are linked to the MME. For example, the destination IP address 210 in message 206 and the source IP address 211 for message 208 identify the MME 201 endpoint of the S1-MME interface. Accordingly, by capturing and analyzing the Attach Request/Attach Accept messages, the monitoring system can identify all active MMEs in the network and can link specific SCTP associations and specific S1-MME interface IP addresses to particular ones of the MMEs.

Monitoring system probe 205 also captures messages on the S6a interface to HSS 203. During an Authentication and Key Agreement (AKA) procedure for UE 204, AIA message 212 and Authentication Request 213 are exchanged among other messages. Although these messages are related to the same AKA procedure, they use different IP addresses on the different interfaces (i.e. S1-MME and S6a). However, the 212 and 213 messages can be correlated using parameters, such as the RAND+AUTN combination 214 or IMSI 215n. The SCTP association for message 213 can be linked to MME 201. Additionally, the IP addresses for the MME endpoint of the SCTP association carrying messages 212 and 213 can also be linked to MME 201.

MME 201 is also coupled to S-GW 216 via an S11 interface. Monitoring system probe 205 may be coupled to the S11 interface to capture PDUs exchanged between MME 201 and S-GW 216. Messages such as Create Session Request 217, Modify Bearer Request 218, and their respective Response messages are exchanged over the S11 interface. The S11 messages include an IMSI parameter that can be correlated to the IMSIs captured on the S1-MME interface from, for example, S1AP Initial UE messages. Once correlated to a particular S1-MME, the source IP addresses for messages 217 and 218 can be added to the list of IP addresses for the MME. Similarly, the destination IP addresses in the corresponding Response messages (not shown) may also be linked to the MME.

By capturing messages as illustrated in FIG. 2, the monitoring system probe may identify any active MMEs in the network and can create a list, table or database of MME parameters, such as illustrated in TABLE 2.

TABLE 2

| MME | MME 1 | MME 2 | MME 3 |
|---|---|---|---|
| GUMMEI | | | |
| SCTP Associations | | | |
| S1-MME IP Addresses | | | |
| S6a IP Addresses | | | |
| S11 IP Addresses | | | |

In a similar manner, using the messages illustrated in FIG. 2, the monitoring system can identify distinct eNodeBs, HSS, S-GW and PDN-GW nodes. For example, there will only be one SCTP association between an eNodeB and an MME. Once the monitoring system identifies an SCTP association for the MME, it can identify the eNodeB at the other endpoint of that association and its IP address. The monitoring system can also create a list, table or database of identifiers, interfaces, associations, and IP addresses linked to each node.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for identifying the topology of a network, comprising:
   capturing, via a monitoring probe, data packets from network interfaces;
   identifying messages specific to S1-MME interfaces;
   identifying GUMMEI parameters in the S1-MME interface messages;
   creating MME node entries in a network topology list in a monitoring system memory, each of the MME nodes corresponding to a unique GUMMEI value;
   identifying individual S1-MME interfaces from SCTP associations corresponding to the S1-MME interface messages;
   linking each individual S1-MME interface to a particular MME in the network topology list;
   identifying IP addresses corresponding to an MME endpoint of the SCTP association carrying the S1-MME interface messages;
   linking each individual IP address to a particular MME in the network topology list;
   identifying individual eNodeBs from the SCTP associations corresponding to the S1-MME interface messages; and
   creating eNodeB entries in the network topology list in the monitoring system memory, each of the eNodeB entries corresponding to a unique SCTP association on the S1-MME interface.

2. The method of claim 1, wherein the messages specific to S1-MME interfaces comprise of Si initial UE messages.

3. The method of claim 1, wherein the messages specific to S1-MME interfaces comprise of Si TAU messages.

4. The method of claim 1, further comprising:
   identifying, by the monitoring system, authentication messages carried on an S6a interface;
   identifying authentication messages carried on an S1-MME interface;
   correlating the S6a and S1-MME authentication messages;
   identifying S6a interface IP addresses corresponding to an MME endpoint of the SCTP association carrying the S6a interface messages; and
   linking each individual S6a interface IP address to a particular MME in the network topology list.

5. The method of claim 4, wherein the S6a and S1-MME authentication messages are correlated using RAND and AUTN parameters.

6. The method of claim 4, wherein the S6a and S1-MME authentication messages are correlated using an IMSI parameter.

7. The method of claim 2, further comprising: creating HSS node entries in the network topology list in the monitoring system memory, each of the HSS nodes associated with a unique S6a interface IP address that corresponds to an HSS endpoint within the S6a interface messages.

8. The method of claim 2, further comprising: creating a single HSS node entry in the network topology list in the monitoring system memory, the single HSS node associated with all S6a interface IP addresses that correspond to an HSS endpoint within the S6a interface messages.

9. The method of claim 1, further comprising:
identifying, by the monitoring system, session or bearer messages carried on an S11 interface;
correlating the S11 session or bearer messages to the messages specific to S1-MME interfaces;
identifying S11 interface IP addresses corresponding to an MME endpoint within the S11 interface messages; and
linking each individual S11 interface IP address to a particular MME in the network topology list.

10. The method of claim 9, wherein the S11 session or bearer messages and the messages specific to S1-MME interfaces are correlated using IMSI parameters.

11. The method of claim 9, further comprising: creating S-GW node entries in the network topology list in the monitoring system memory, each of the S-GW nodes associated with a unique S11 interface IP address that corresponds to an S-GW endpoint within the S11 interface messages.

12. The method of claim 1, further comprising:
identifying IP addresses corresponding to an eNodeB endpoint of the SCTP association carrying the S1-MME interface messages; and
linking each individual IP address to a particular eNodeB in the network topology list.

13. The method of claim 12, further comprising:
identifying messages specific to X2interfaces;
identifying IP addresses within the X2interface messages SCTP association, wherein IP addresses for each X2endpoint correspond to an eNodeB;
correlating each of the X2interface IP addresses to an S1-MME interface IP address that corresponds to an eNodeB endpoint; and
linking the X2interface IP addresses to particular eNodeBs in the network topology list.

14. The method of claim 1, further comprising:
identifying session or bearer messages carried on an S5/S8interface;
identifying S5/S8interface IP addresses corresponding to a PDN-GW endpoint within the S5/S8interface messages; and
creating PDN-GW node entries in the network topology list in the monitoring system memory, each of the PDN-GW nodes associated with a unique S5/S8interface IP address that corresponds to an PDN-GW endpoint within the S5/S8interface messages.

15. A method for identifying the topology of a network, comprising:
capturing, via a monitoring probe, data packets from network interfaces;
identifying messages specific to S1-MME interfaces;
identifying GUMMEI parameters in the S1-MME interface messages;
creating MME node entries in a network topology list in a monitoring system memory, each of the MME nodes corresponding to a unique GUMMEI value;
identifying individual S1-MME interfaces from SCTP associations corresponding to the S1-MME interface messages;
linking each individual S1-MME interface to a particular MME in the network topology List;
identifying IP addresses corresponding to an MME endpoint of the SCTP association carrying the S1-MME interface messages;
linking each individual IP address to a particular MME in the network topology list;
identifying session or bearer messages carried on an S5/S8interface;
identifying S5/S8interface IP addresses corresponding to a PDN-GW endpoint within the S5/S8interface messages; and
creating a single PDN-GW node entry in the network topology list in the monitoring system memory, the PDN-GW node entry associated with each unique S5/S8interface IP address that corresponds to an PDN-GW endpoint within the S5/S8interface messages.

16. The method of claim 15, further comprising:
identifying S5/S8interface IP addresses corresponding to an S-GW endpoint within the S5/S8interface messages; and
linking each individual S5/S8interface IP address to a particular S-GW in the network topology list.

17. A network monitoring system comprising:
one or more passive monitoring probes coupled to network interfaces, the probes capable of capturing data packets from the network interfaces; and
a processor receiving the captured data packets from the probes, the processor operating to:
identify messages specific to S1-MME interfaces from data packets captured from the network interfaces;
identify GUMMEI parameters in the S1-MME interface messages;
create MME node entries in a network topology list in a monitoring system memory, each of the MME nodes corresponding to a unique GUMMEI value;
identify individual S1-MME interfaces from SCTP associations corresponding to the S1-MME interface messages;
link each individual S1-MME interface to a particular MME in the network topology list;
identify IP addresses corresponding to an MME endpoint of the SCTP association carrying the S1-MME interface messages;
link each individual IP address to a particular MME in the network topology list;
correlate authentication messages carried on S6a and S1-MME interfaces;
identify S6a interface IP addresses corresponding to an MME endpoint of the SCTP association carrying the S6a interface messages;
link each individual S6a interface IP address to a particular MME in the network topology list;
create a single HSS node entry in the network topology list in the monitoring system memory, the single HSS node associated with all S6a interface IP addresses that correspond to an HSS endpoint within the S6a interface messages;
correlate S11 session or bearer messages to the messages specific to S1-MME interfaces;
identify S11 interface IP addresses corresponding to an MME endpoint within the S11 interface messages;
link each individual S11 interface IP address to a particular MME in the network topology list;
create S-GW node entries in the network topology list in the monitoring system memory, each of the S-GW nodes associated with a unique S11 interface IP address that corresponds to an S-GW endpoint within the S11 interface messages; and create eNodeB entries in the network topology list in the monitoring system memory, each of the eNodeB entries corresponding to a unique SCTP association on the S1-MME interface.

* * * * *